US012784514B2

(12) United States Patent
Zhang

(10) Patent No.: US 12,784,514 B2
(45) Date of Patent: Nov. 3, 2026

(54) METHOD AND SYSTEM FOR DIAGNOSING VEHICLE FAULTS USING A KNOWLEDGE GRAPH

(71) Applicant: CAROTA Technology Corporation, Shanghai (CN)

(72) Inventor: Xinjie Zhang, Shanghai (CN)

(73) Assignee: CAROTA Technology Corporation, Shanghai (CN)

( * ) Notice: Subject to any disclaimer, the term of this patent is extended or adjusted under 35 U.S.C. 154(b) by 70 days.

(21) Appl. No.: 18/963,673

(22) Filed: Nov. 28, 2024

(65) Prior Publication Data

US 2025/0095415 A1 Mar. 20, 2025

(30) Foreign Application Priority Data

Aug. 6, 2024 (CN) ......................... 202411070504.0

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01)

(58) Field of Classification Search
CPC ... G07C 5/008; G07C 5/0808; G05B 23/0213
See application file for complete search history.

(56) References Cited

U.S. PATENT DOCUMENTS

| | | | | |
|---|---|---|---|---|
| 2012/0151290 | A1 | 6/2012 | Singh et al. | |
| 2019/0130669 | A1* | 5/2019 | Boggio ................ | G05B 23/024 |
| 2024/0004747 | A1 | 1/2024 | Nishino et al. | |
| 2024/0132230 | A1* | 4/2024 | Adhikari ................ | G07C 5/006 |
| 2024/0370008 | A1 | 11/2024 | Mahringer | |

FOREIGN PATENT DOCUMENTS

| | | | |
|---|---|---|---|
| CN | 114879632 | A | 8/2022 |
| CN | 117234190 | A | 12/2023 |
| CN | 117522372 | A | 2/2024 |

* cited by examiner

*Primary Examiner* — Aniss Chad
*Assistant Examiner* — Chase L Cooley

(57) ABSTRACT

The disclosure provides a method and system for diagnosing vehicle faults using a knowledge graph. A fault snapshot image can be generated when a fault monitoring module of a vehicle terminal detects a vehicle fault. A cloud server can parse from the fault snapshot image a vehicle information and perform a progressive fault diagnosis in a fault knowledge graph at the cloud server using the vehicle information to determine a target repair suggestion node.

10 Claims, 3 Drawing Sheets

METHOD AND SYSTEM FOR DIAGNOSING VEHICLE FAULTS USING A KNOWLEDGE GRAPH

CROSS-REFERENCE TO RELATED APPLICATIONS

This application claims priority to Chinese patent application No. 202411070504.0, filed on Aug. 6, 2024, the contents of which are incorporated herein by reference.

TECHNICAL FIELD

This disclosure relates generally to automated fault diagnosis for vehicles, particularly to methods and systems for diagnosing vehicle faults using a knowledge graph.

BACKGROUND

The method for diagnosing vehicle faults using knowledge graph is a methodology that employs big data and artificial intelligence technology to construct a knowledge graph through the analysis of analyzing repair history data. The knowledge graph is then utilized to automatically identify, classify and recommend repair actions for vehicle faults, thereby enhancing repair efficiency and accuracy.

The method for diagnosing vehicle faults using knowledge graph first extracts valuable information from a vast repository of repair data through entity extraction and relationship recognition technology, and subsequently organizes this information into a knowledge graph. Based on this methodology, the system is able to diagnose vehicle faults, determine the possible faulty components, and provide repair guidance for the faulty components the use of sophisticated algorithmic models, such as the XGBoost fault classification model. This not only enhances the precision of fault diagnosis but also considerably reduces the time required for diagnosis and improves repair efficiency. Moreover, this method enables continuous enhancement of fault diagnosis accuracy through ongoing learning and updating of the knowledge graph, thereby furnishing a robust data support for vehicle repair.

SUMMARY

A first aspect of the disclosure provides a method for diagnosing vehicle faults using a knowledge graph. In some embodiments, the method can comprise: (a) generating a fault snapshot image when a fault monitoring module of a vehicle terminal detects a vehicle fault; (b) transmitting the fault snapshot image from the vehicle terminal to a cloud server; (c) parsing a vehicle information at the cloud server from the fault snapshot image, and performing a progressive fault diagnosis in a fault knowledge graph stored at the cloud server based on the vehicle information to determine a target repair suggestion node; and (d) transmitting from the cloud server an information of the target repair suggestion node as a diagnostic information to the vehicle terminal. In some instances, the fault knowledge graph can comprise abnormal signal nodes, faulty component nodes and repair suggestion nodes. The abnormal signal nodes can each be associated with one or more faulty component nodes that are related to a generation of the vehicle fault. The faulty component nodes can each be associated with one or more repair suggestion nodes that provide repair suggestions for the faulty component node. A plurality of the abnormal signal nodes having a mutual influence or co-occurrence relationship on a generation of the vehicle fault can be associated with each other.

In some embodiments, the processing (c) can comprise the cloud server extracting from the fault snapshot image the vehicle information that is associated with the vehicle fault. The vehicle information can comprise a time of fault, a vehicle driving mode, a vehicle status, a vehicle sensor data, a vehicle driving data or any combination thereof. The repair suggestion node can comprise a description of fault symptom and corresponding solution, an image of the faulty component, a troubleshooting video or any combination thereof.

In some embodiments, the progressive fault diagnosis can comprise: (i) identifying an abnormal signal from the vehicle information; (ii) locating in the knowledge graph the abnormal signal node corresponding to the abnormal signal; (iii) determining one or more faulty component nodes associated with the abnormal signal node as candidate faulty component node(s); (iv) determining one or more repair suggestion nodes associated with the candidate faulty component node(s); (v) vector-matching one or more feature vectors of the one or more repair suggestion nodes with a fault feature vector extracted from the fault snapshot to determine the target repair suggestion node; and (vi) transmitting the target repair suggestion node as the diagnostic information to the vehicle terminal.

In some embodiments, the processing (iii) can comprise: determining one or more other abnormal signal nodes that are associated with the abnormal signal node corresponding to the abnormal signal; determining whether the one or more vehicle signals corresponding to the one or more other abnormal signal nodes are abnormal; and if the one or more vehicle signals corresponding to the one or more other abnormal signal nodes are abnormal, determining one or more faulty component nodes associated with the one or more other abnormal signal nodes as the candidate faulty component node(s).

In some embodiments, the processing (v) can comprise extracting the one or more feature vectors from the one or more repair suggestion nodes using a convolutional neural network model, and extracting the fault feature vector from the fault snapshot using the convolutional neural network model. In some embodiments, the processing (v) can comprise determining, from the one or more repair suggestion nodes, the repair suggestion node having the highest degree of vector-matching with the fault feature vector as the target repair suggestion node. In some embodiments, the processing (v) can comprise determining, from the one or more repair suggestion nodes, one or more repair suggestion nodes having a degree of vector-matching with the fault feature vector that exceeds a preset value as the target repair suggestion nodes.

A second aspect of the disclosure provides a system for diagnosing vehicle faults using a knowledge graph. In some embodiments, the system can comprise a vehicle terminal and a cloud server. The vehicle terminal can comprise a fault monitoring module configured to generate a fault snapshot image in the event of a vehicle fault, and a fault transmitting module configured to transmit the fault snapshot image to the cloud server. The cloud server can comprise a fault knowledge graph, a fault snapshot receiving module, and a fault diagnosis module. The fault knowledge graph can comprise abnormal signal nodes, faulty component nodes and repair suggestion nodes. The abnormal signal nodes can be each associated with one or more faulty component nodes that are related to a generation of the vehicle fault. The faulty component nodes can be each associated with one or more repair suggestion nodes that provide repair suggestions for the faulty component node. A plurality of the abnormal signal nodes having a mutual influence or co-occurrence relationship on a generation of the vehicle fault can be associated with each other. The fault snapshot receiving module can be configured to receive the fault snapshot image from the vehicle terminal. The fault diagnosis module can be configured to parse a vehicle information from the fault snapshot image, perform a progressive fault diagnosis in the fault knowledge graph based on the vehicle information to determine a target repair suggestion node, and transmit an information of the target repair suggestion node as a diagnostic information to the vehicle terminal.

In some embodiments, the fault diagnosis module can be further configured to extract from the fault snapshot image the vehicle information that is associated with the vehicle fault. The vehicle information can comprise a time of fault, a vehicle driving mode, a vehicle status, a vehicle sensor data, a vehicle driving data or any combination thereof. The repair suggestion node can comprise a description of fault symptom and corresponding solution, an image of the faulty component, a troubleshooting video or any combination thereof.

In some embodiments, the fault diagnosis module can be further configured to (i) identify an abnormal signal from the vehicle information; (ii) locate in the knowledge graph the abnormal signal node corresponding to the abnormal signal; (iii) determine one or more faulty component nodes associated with the abnormal signal node as candidate faulty component node(s); (iv) determine one or more repair suggestion nodes associated with the candidate faulty component node(s); (v) vector-match one or more feature vectors of the one or more repair suggestion nodes with a fault feature vector extracted from the fault snapshot to determine the target repair suggestion node; and (vi) transmit the target repair suggestion node as the diagnostic information to the vehicle terminal.

In some embodiments, the processing (iii) can comprise determining one or more other abnormal signal nodes that are associated with the abnormal signal node corresponding to the abnormal signal; determining whether the one or more vehicle signals corresponding to the one or more other abnormal signal nodes are abnormal; and if the one or more vehicle signals corresponding to the one or more other abnormal signal nodes are abnormal, determining one or more faulty component nodes associated with the one or more other abnormal signal nodes as the candidate faulty component node(s).

In some embodiments, the processing (v) can comprise extracting the one or more feature vectors from the one or more repair suggestion nodes using a convolutional neural network model, and extracting the fault feature vector from the fault snapshot using the convolutional neural network model.

In some embodiments, the processing (v) can comprise determining, from the one or more repair suggestion nodes, the repair suggestion node having the highest degree of vector matching with the fault feature vector as the target repair suggestion node. In some embodiments, the processing (v) can comprise determining, from the one or more repair suggestion nodes, one or more repair suggestion nodes having a degree of vector matching with the fault feature vector that exceeds a preset value as the target repair suggestion nodes.

A third aspect of the disclosure provides a system comprising one or more computer processors and a computer-readable memory, wherein the computer readable memory comprising machine executable code that, upon execution by the one or more computer processors, implements a method for diagnosing vehicle faults using a knowledge graph of the disclosure.

It should be understood that the disclosure does not intend to identify the key or important features of the embodiments of the disclosure, nor is it intended to limit the scope of the disclosure. Other features of the disclosure will become easily understood through the following description.

BRIEF DESCRIPTION OF THE DRAWINGS

The novel features of the disclosure are set forth with particularity in the appended claims. A better understanding of the features and advantages of the disclosure will be obtained by reference to the following detailed description that sets forth illustrative embodiments, in which the principles of the disclosure are utilized, and the accompanying drawings.

DETAILED DESCRIPTION

Traditional methods for vehicle fault troubleshooting depend on standard fault codes generated by the vehicle computer (ECU) following a fault. Technicians can determine the cause of the fault and fix it by analyzing the fault codes and related log data. The restricted range of failures that fault code-dependent diagnostic approaches cover, however, limits their applicability.

Current fault diagnostic approaches face several challenges: first, these approaches rely excessively on the personal experience of repair personnel, which varies in level; second, analyzing the cause of the fault is often time-consuming and costly; and finally, the experience of vehicle repair personnels is not effectively consolidated and accumulated for recurring faults, resulting in an inability to fully utilize the repair knowledge and solutions currently available.

In view of the above problems in the prior art, the disclosure proposes a new method for diagnosing vehicle faults that takes into amount more comprehensive information, including the vehicle's driving mode, operating status, signals and driving data, to provide a more accurate diagnosis of vehicle faults.

Figure 1:
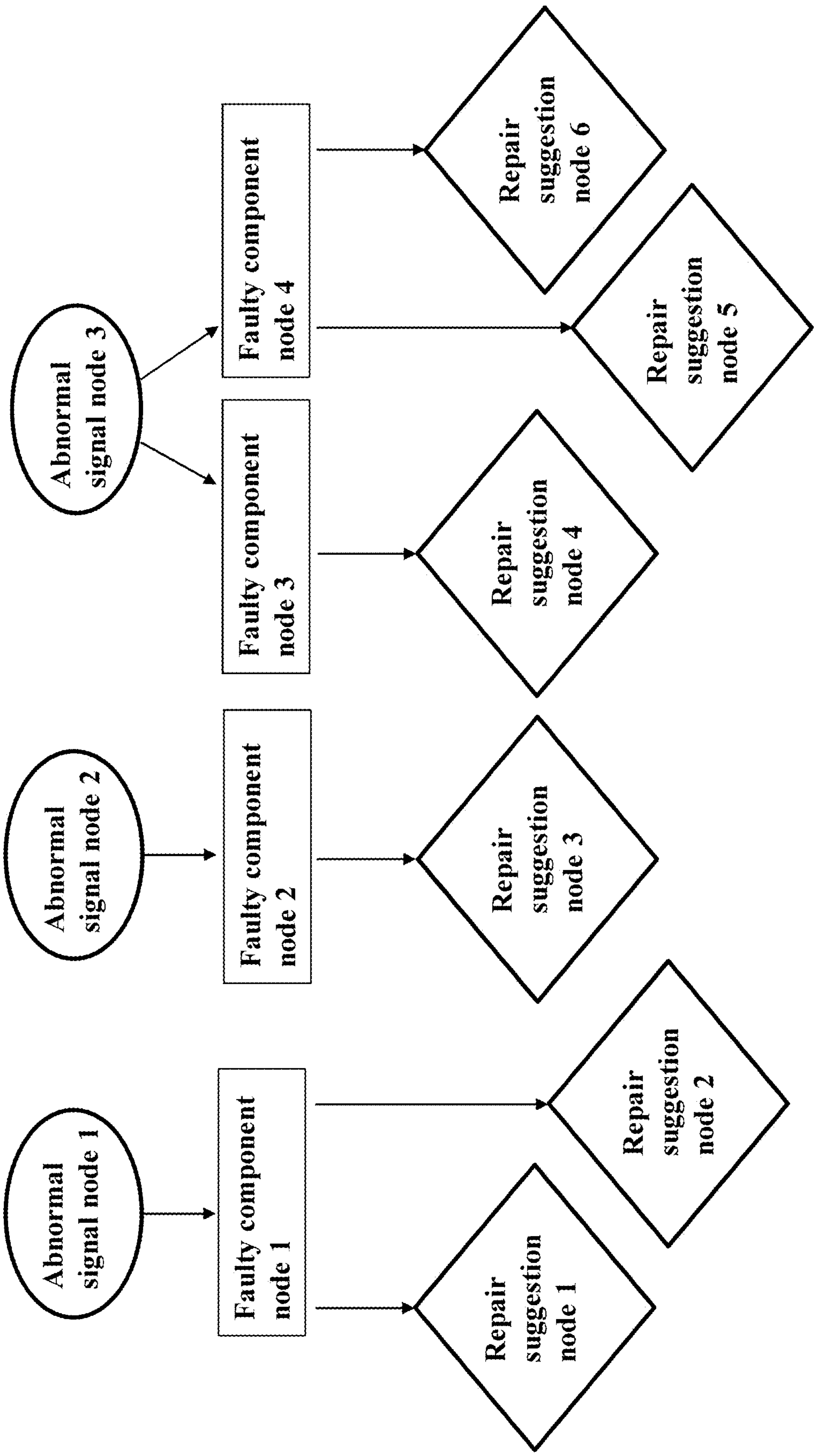
FIG. 1 shows structure of an exemplary knowledge graph of vehicle fault of the disclosure.

As illustrated in FIG. 1, the disclosure provides a knowledge graph for vehicle fault diagnosis. The knowledge graph constructs a semantic association network. In some instances, the knowledge graph of the disclosure is a graph-based data structure, including nodes (Points) and edges (Edges) connecting the nodes. In some instances, the knowledge graph of the disclosure can integrate multiple types of nodes, such as abnormal signal nodes, faulty component nodes, and repair suggestion nodes, thereby providing a comprehensive framework of information for vehicle fault diagnosis and repair. In some instances, the abnormal signal node represents an abnormal signal appearing in the vehicle system indicative of a problem or fault (for example, a signal indicating a low battery charge). The faulty component node represents one or more vehicle components (for example, a battery) that may cause the abnormal signal node. The repair suggestion node provides one or more suggestions for addressing the faulty component (for example, checking the connection or charge of the battery).

In some instances, the abnormal signal node can be associated with one or more faulty component nodes that may generate the abnormal signal. The association can be represented by an edge between the abnormal signal node and the faulty component node(s). The faulty component node can be associated with one or more repair suggestion nodes that provide recommended repair measures for the faulty component. The association can be represented by an edge between the faulty component node and the repair suggestion node(s). In some instances, a value of the edge between the faulty component node and the repair suggestion node can be 1. In some instances, the value of the edge between the faulty component node and the repair suggestion node can be a statistically determined probability value for the association.

In a non-limiting example, for the fault “engine failing to start”, the knowledge graph of the disclosure can comprise (i) abnormal signal nodes, including a “battery low power abnormal signal node”, a “faulty fuel system abnormal signal node” and a “faulty ignition system abnormal signal node”; (ii) faulty component nodes, including a “battery node”, a “fuel pump node”, an “injector node”, a “fuel filter node”, a “spark plug node” and an “ignition coil node”; and (iii) repair suggestion nodes, including a “battery repair suggestion node”, a “fuel pump repair suggestion node”, a “injector repair suggestion node”, a “fuel filter repair suggestion node”, a “spark plug repair suggestion node” and an “ignition coil repair suggestion node”. The repair suggestion nodes respectively comprise inspection/repair suggestions, such as textual descriptions, audio and/or video tutorials, for the battery, fuel pump, injector, fuel filter, spark plug and ignition coil. One abnormal signal node can be associated with one or more faulty component nodes. For example, a “battery low power abnormal signal node” can be associated with a “battery node”. For example, a “faulty fuel system abnormal signal node” can be associated with three faulty component nodes: a “fuel pump node”, a “fuel injector node” and a “fuel filter node”.

In another non-limiting example, for the fault “engine temperature is too high”, the knowledge graph of the disclosure can comprise (i) abnormal signal nodes associated with the fault “engine temperature is too high”, including a “temperature sensor abnormal signal node” and a “cooling system abnormal signal node”; (ii) faulty component nodes associated with the “temperature sensor abnormal signal node” and the “cooling system abnormal signal node”, including a “temperature sensor node”, a “water pump node”, a “radiator node” and a “coolant tank node”; and (iii) repair suggestion nodes associated with the faulty component nodes, including a “temperature sensor repair suggestion node”, a “water pump repair suggestion node”, a “radiator repair suggestion node” and a “coolant tank repair suggestion node”. The repair suggestion nodes respectively comprise inspection/repair suggestions, such as textual descriptions, audio and/or video tutorials, for the temperature sensor, water pump, radiator and coolant tank.

A particular vehicle fault can be associated with a plurality of abnormal signal nodes, which can occur simultaneously or interact with each other. In some instances, in the knowledge graph of the disclosure, the plurality of abnormal signal nodes associated with the same vehicle fault can be associated with each other. Such association can be represented by edges between the plurality of abnormal signal nodes. In a non-limiting example, a plurality of abnormal signal nodes can cause the fault “brake system failure” such as “brake pad wear abnormal signal node”, “brake fluid volume abnormal signal node”, “brake fluid line clogging abnormal signal node” and “brake fluid cleanliness abnormal signal node”. These abnormal signal nodes can be associated with each other, affect each other or occur simultaneously. For example, a brake pad wear can reduce a braking force, while a brake fluid contamination can further affect the braking effectiveness. A brake fluid leakage can result in the brake fluid not being properly delivered to the brake devices, while a brake line clogging can prevent the brake fluid from flowing. In another non-limiting example, for the fault “engine failing to start”, there can be a plurality of abnormal signal nodes that are associated with each other, affect each other or appear at the same time, such as “low battery power abnormal signal node”, “faulty fuel system abnormal signal node” and “faulty ignition system abnormal signal node”.

A value can be assigned to the line (edge) between abnormal signal nodes. In some instances, a value can be assigned to the line (edge) between two abnormal signal nodes based on a probability of the two abnormal signals occurring at the same time. For example, if the probability that a faulty fuel system and a faulty ignition system occur at the same time being 0.4 according to a priori statistics, a value of 0.4 can be assigned to the line (edge) between the “faulty fuel system abnormal signal node” and the “faulty ignition system abnormal signal node”.

Figure 2:
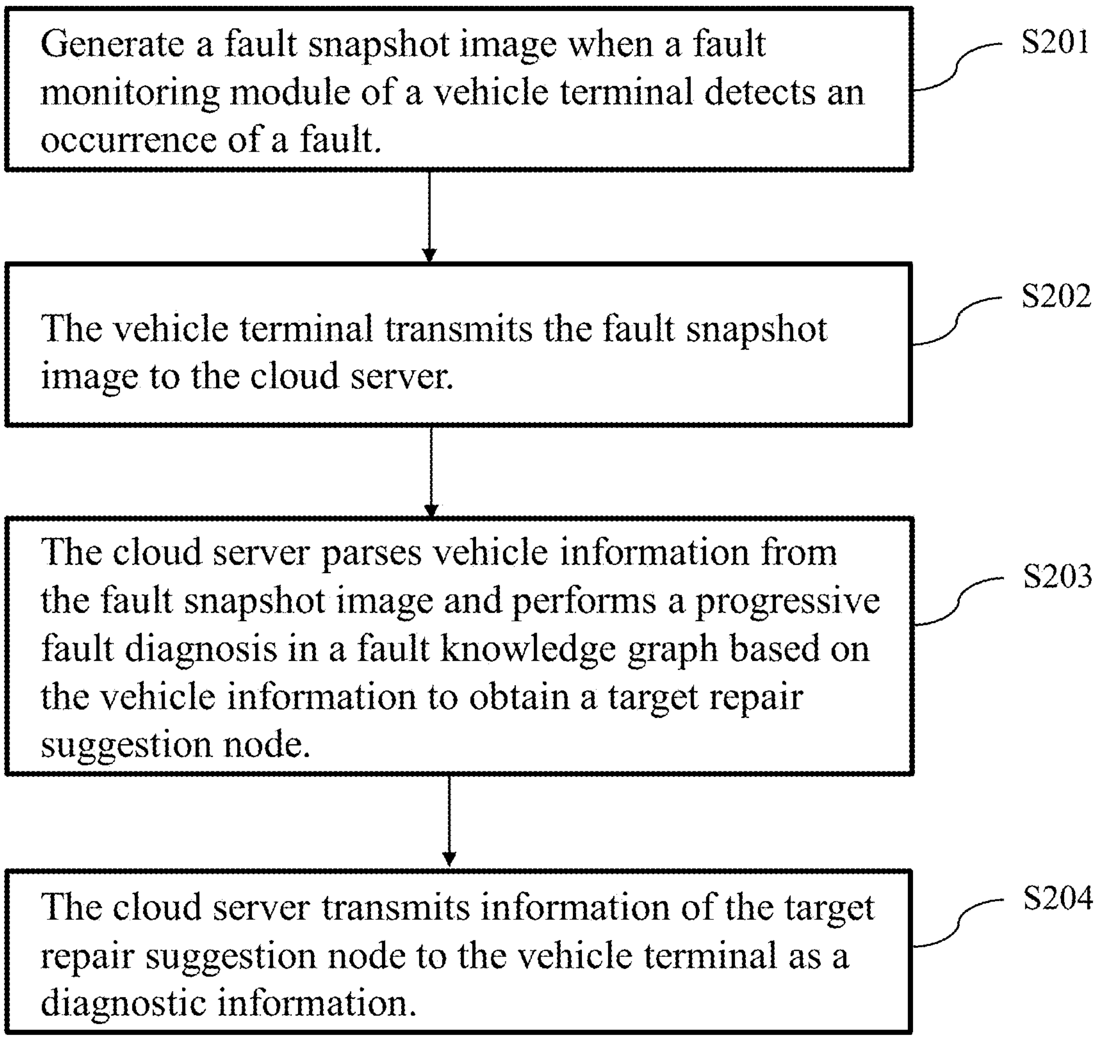
FIG. 2 is a flow chart illustrating a method for diagnosing vehicle faults according to an embodiment of the disclosure.

FIG. 2 is a flow chart illustrating a method for diagnosing vehicle faults according to an embodiment of the disclosure. In some embodiments, the method can include steps S201-S204. In step S201, a fault snapshot image can be generated when a fault monitoring module of a vehicle terminal detects an occurrence of a fault. Detecting an occurrence of a fault can comprise the vehicle terminal detecting a fault signal (e.g., a fault code) or an indicator signal (e.g., a low battery indicator is on). Detecting of an occurrence of a fault can also comprise a fault indication such as a vehicle intelligence system reporting “cannot start the car”. In some instances, the vehicle terminal can collect information via the CAN network, and the fault monitoring module can collect and summarize the collected information to generate a fault snapshot image. In step S202, the vehicle terminal can transmit the fault snapshot image to the cloud server.

In step S203, the cloud server can parse a vehicle information from the fault snapshot image and perform a progressive fault diagnosis in a fault knowledge graph stored at the cloud server based on the vehicle information to determine a target repair suggestion node. In some instances, parsing the vehicle information can comprise the cloud server extracting from the fault snapshot image the vehicle information associated with the fault. The vehicle information can comprise a time of fault occurrence, a vehicle driving mode, a vehicle status, a vehicle sensor data, a vehicle driving data or any combination thereof. The vehicle driving mode can comprise an automatic driving mode, an assisted driving mode and a manual driving mode. The vehicle status can comprise a vehicle starting, a vehicle accelerating, a vehicle changing lanes, a vehicle decelerating, a vehicle braking and a vehicle standing still. The vehicle sensor data can comprise data collected with various components or sensors onboard the vehicle, including but not limited to a battery temperature, a battery power, a coolant temperature, a cabin temperature, and the like. The vehicle driving data can comprise a vehicle instantaneous speed, a vehicle average speed, a vehicle acceleration, and the like. In step S204, the cloud server can transmit information of the target repair suggestion node to the vehicle terminal as a diagnostic information.

In some embodiments, the progressive fault diagnosis performed by the cloud server can comprise: (i) identifying an abnormal signal from the vehicle information; (ii) locating in the knowledge graph the abnormal signal node corresponding to the abnormal signal; (iii) determining one or more faulty component nodes associated with the abnormal signal node as candidate faulty component node(s); (iv) determining one or more repair suggestion nodes associated with the candidate faulty component node(s); (v) matching one or more feature vectors of the one or more repair suggestion nodes with a fault feature vector extracted from the fault snapshot, and determining, from the one or more repair suggestion nodes, the repair suggestion node having the highest degree of vector-matching with the fault feature vector as the target repair suggestion node; or, determining, from the one or more repair suggestion nodes, one or more repair suggestion nodes having a degree of vector-matching with the fault feature vector that exceeds a preset value as the target repair suggestion nodes; and (vi) transmitting the target repair suggestion node as the diagnostic information to the vehicle terminal.

In some instances, identifying an abnormal signal from the vehicle information can comprise: the cloud server extracting from the fault snapshot image the vehicle information associated with the fault. In some instances, the vehicle information can comprise a time of the fault, a vehicle driving mode, a vehicle status, a vehicle sensor data, a vehicle driving data or any combination thereof. In some instances, after parsing from the fault snapshot image the vehicle information such as the time of the fault, the vehicle driving mode, the vehicle status, the vehicle signal, the vehicle driving data, and the like, the vehicle information can be compared with a normal value or a normal value range. The vehicle information that exceeds the normal data can be identified as an abnormal signal if one or more vehicle information exceeds the normal value range. In some instances, vehicle information having a rate of change exceeding a preset threshold can be identified as an abnormal signal.

In a non-limiting example, if an "engine temperature value", which is indicated by an "engine temperature signal" parsed from the fault snapshot image, is higher than a preset threshold, then the "engine temperature signal" can be identified as an abnormal signal. Subsequently, an abnormal signal node "engine temperature signal node" corresponding to the abnormal signal "engine temperature signal" can be located in the knowledge graph, and the faulty component nodes associated with the abnormal signal node "engine temperature signal node", including but not limited to a temperature sensor node, a water pump node, a radiator node and a coolant tank node, can be determined as candidate faulty component nodes. Then, the repair suggestion nodes associated with the temperature sensor node, the water pump node, the radiator node and the coolant tank node can be determined, including but not limited to "checking the temperature sensor node", "checking the water pump node", "checking the radiator node" and "checking the coolant node".

In some instances, to ensure an accuracy of fault diagnosis, a machine learning model (e.g., a convolutional neural network model (CNN)) can be utilized to extract the fault feature vector from the fault snapshot and extract the feature vector from the repair suggestion node. A vector-matching can be performed to determine the most accurate target repair suggestion node. In some instances, among the one or more repair suggestion nodes, the repair suggestion node having the highest degree of vector-matching with the fault feature vector can be determined as the target repair suggestion node. In some instances, among the one or more repair suggestion nodes, one or more repair suggestion nodes having a degree of vector-matching with the fault feature vector exceeding a preset value can be determined as the target repair suggestion node(s). In some instances, vector-matching can be implemented using a similarity matching algorithm. The matching process can be performed based on various criteria, such as Euclidean distance or cosine similarity, to determine, from among one or more repair suggestion nodes, the repair suggestion node having the highest degree of vector-matching with the fault feature vector. In this way, upon a new fault is detected by the vehicle terminal, the machine learning model can quickly provide accurate repair suggestions, thereby significantly reducing the time required for diagnosis and enhancing the efficiency and reliability of repair operations and equipment. In addition, over time, the matching process can be continuously optimized to obtain more accurate repair suggestions by continuously learning new fault cases, thereby realizing an intelligent repair recommendation.

In some embodiments, determining one or more faulty component nodes associated with the abnormal signal node as candidate faulty component node(s) can comprise: determining one or more other abnormal signal nodes that are associated with the abnormal signal node corresponding to the abnormal signal; determining whether the one or more vehicle signals corresponding to the one or more other abnormal signal nodes are abnormal; and if the one or more vehicle signals corresponding to the one or more other abnormal signal nodes are abnormal, determining one or more faulty component nodes associated with the one or more other abnormal signal nodes as the candidate faulty component node(s).

In a non-limiting example, if a vehicle fault "brake system failure" is detected and an abnormal signal "brake fluid insufficient" is parsed from the fault snapshot image, an abnormal signal node "brake fluid leakage abnormal signal node" corresponding to the abnormal signal "brake fluid shortage" can be located in the knowledge graph. Subsequently, a faulty component node "brake fluid tank" associated with the abnormal signal node "brake fluid leakage abnormal signal node" can be determined as a candidate faulty component node. The process can further comprise determining whether there are one or more other abnormal signal nodes that are associated with the abnormal signal node "brake fluid leakage abnormal signal node". In this example, other normal signal nodes "brake pad wear abnormal signal node", "brake fluid line clogging abnormal signal node" and "brake fluid contamination abnormal signal node" can be associated with the abnormal signal node "brake fluid leakage abnormal signal node". Next, the process can comprise determining whether the vehicle signals corresponding to the above other abnormal signal nodes, such as a brake pad thickness signal and a brake fluid cleanliness, are abnormal. If the brake pad thickness signal is abnormal, then the "brake pad node", which is associated with the "brake pad wear abnormal signal node" corresponding to the brake pad thickness signal, can also be determined as a candidate faulty component node.

Figure 3:
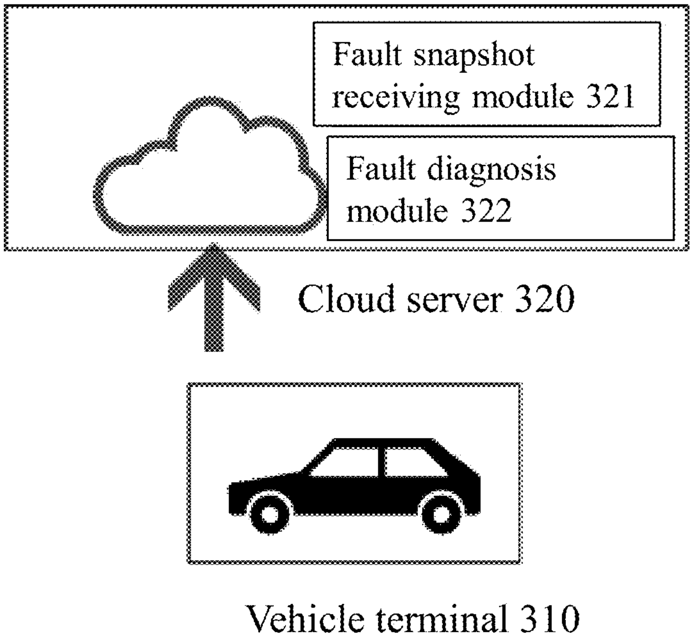
FIG. 3 is a block diagram of a system for diagnosing vehicle faults according to an embodiment of the disclosure.

FIG. 3 is a block diagram of a system for diagnosing vehicle faults according to an embodiment of the disclosure. In some embodiments, the system for diagnosing vehicle faults using a knowledge graph of the disclosure can include a vehicle terminal 310 and a cloud server 320. The vehicle terminal 310 can comprise a fault monitoring module and a fault transmitting module. The fault monitoring module can be configured to generate a fault snapshot image when a vehicle fault is detected. The fault transmitting module can be configured to transmit the fault snapshot image to the cloud server 320.

The cloud server 320 of the disclosure can comprise a fault knowledge graph (not shown), a fault snapshot receiving module 321 and a fault diagnosis module 322. In some embodiments, the fault knowledge graph can comprise an abnormal signal node, a faulty component node and a repair suggestion node. The abnormal signal node can each be associated with one or more faulty component nodes that account for a generation of the vehicle fault. The faulty component node can each be associated with one or more repair suggestion nodes that provide repair suggestions for the faulty component. In some instances, a plurality of abnormal signal nodes that have a mutual influence or co-occurrence relationship on the generation of a vehicle fault can be associated with each other.

In some embodiments, the fault snapshot receiving module 321 can be configured to receive the fault snapshot image from the vehicle terminal. The fault diagnosis module 322 can be configured to parse the vehicle information from the fault snapshot image, perform a progressive fault diagnosis in the fault knowledge graph based on the vehicle information to determine a target repair suggestion node, and transmit information of the target repair suggestion node as diagnostic information to the vehicle terminal. In some embodiments, the fault diagnosis module 322 can be further configured to extract, from the fault snapshot image, the vehicle information associated with the vehicle fault. The vehicle information can include an occurrence time of the fault, a vehicle driving mode, a vehicle status, a vehicle sensor data, a vehicle driving data or any combination thereof.

In some embodiments, the fault diagnosis module 322 can be further configured to: (i) identify an abnormal signal from the vehicle information; (ii) locate in the knowledge graph the abnormal signal node corresponding to the abnormal signal; (iii) determine one or more faulty component nodes associated with the abnormal signal node as candidate faulty component node(s); (iv) determine one or more repair suggestion nodes associated with the candidate faulty component node(s); (v) vector-match one or more feature vectors of the one or more repair suggestion nodes with fault feature vector extracted from the fault snapshot to determine the target repair suggestion node; and (vi) transmit the target repair suggestion node as the diagnostic information to the vehicle terminal.

In some embodiments, the process (iii) performed by the fault diagnosis module 322 to determine one or more faulty component nodes associated with the abnormal signal node as candidate faulty component node(s) can comprise: determining one or more other abnormal signal nodes that are associated with the abnormal signal node corresponding to the abnormal signal; determining whether the one or more vehicle signals corresponding to the one or more other abnormal signal nodes are abnormal; and if the one or more vehicle signals corresponding to the one or more other abnormal signal nodes are abnormal, determining one or more faulty component nodes associated with the one or more other abnormal signal nodes as the candidate faulty component node(s).

In some embodiments, the vector-matching performed by the fault diagnosis module 322 can comprise: extracting the one or more feature vectors from the one or more repair suggestion nodes using a convolutional neural network model, and extracting the fault feature vector from the fault snapshot using the convolutional neural network model. In an example, from among the one or more repair suggestion nodes, the repair suggestion node having the highest degree of vector-matching with the fault feature vector can be determined as the target repair suggestion node. In an example, from among the one or more repair suggestion nodes, one or more repair suggestion nodes having a degree of vector matching with the fault feature vector that exceeds a preset value can be determined as the target repair suggestion nodes.

The disclosure also provides a system including one or more computer processors and a computer readable memory. The computer readable memory can include machine executable code, which implements the method for diagnosing vehicle faults using knowledge graph of the disclosure when executed by the one or more computer processors.

While preferred embodiments of the present invention have been shown and described herein, it will be obvious to those skilled in the art that such embodiments are provided by way of example only. Numerous variations, changes, and substitutions will occur to those skilled in the art without departing from the invention.

What is claimed is:

1. A method for diagnosing vehicle faults using a knowledge graph, the method comprising:

(a) generating, by a vehicle terminal, a fault snapshot image when the vehicle terminal detects a vehicle fault;

(b) transmitting, by the vehicle terminal, the fault snapshot image to a cloud server;

(c) parsing, by the cloud server, a vehicle information from the fault snapshot image, and performing, by the cloud server, a progressive fault diagnosis in a fault knowledge graph stored based on the vehicle information to determine a target repair suggestion node, wherein the progressive fault diagnosis comprises:

(i) identifying an abnormal signal from the vehicle information;

(ii) locating in the knowledge graph the abnormal signal node corresponding to the abnormal signal;

(iii) determining one or more faulty component nodes associated with the abnormal signal node as candidate faulty component node(s);

(iv) determining one or more repair suggestion nodes associated with the candidate faulty component node (s);

(v) vector-matching one or more feature vectors of the one or more repair suggestion nodes with a fault feature vector extracted from the fault snapshot to determine the target repair suggestion node; and (vi) transmitting the target repair suggestion node as the diagnostic information to the vehicle terminal, wherein the processing (iii) comprises:

determining one or more other abnormal signal nodes that are associated with the abnormal signal node corresponding to the abnormal signal;

determining whether the one or more vehicle signals corresponding to the one or more other abnormal signal nodes are abnormal; and when the one or more vehicle signals corresponding to the one or more other abnormal signal nodes are abnormal, determining one or more faulty component nodes associated with the one or more other abnormal signal nodes as the candidate faulty component node(s), wherein the processing (v) comprises:

extracting the one or more feature vectors from the one or more repair suggestion nodes using a convolutional neural network model; and extracting the fault feature vector from the fault snapshot using the convolutional neural network model; and (d) transmitting, by the cloud server an information of the target repair suggestion node as a diagnostic information to the vehicle terminal, wherein the fault knowledge graph comprises abnormal signal nodes, faulty component nodes and repair suggestion nodes, wherein the abnormal signal nodes are each associated with one or more faulty component nodes that are related to a generation of the vehicle fault, wherein the faulty component nodes are each associated with one or more repair suggestion nodes that provide repair suggestions for the faulty component node, and wherein a plurality of the abnormal signal nodes having a mutual influence or co-occurrence relationship on a generation of the vehicle fault are associated with each other.

2. The method of claim 1, wherein the processing (c) comprises the cloud server extracting from the fault snapshot image the vehicle information that is associated with the vehicle fault, and wherein the vehicle information comprises a time of fault, a vehicle driving mode, a vehicle status, a vehicle sensor data, a vehicle driving data or any combination thereof.

3. The method of claim 1, wherein the repair suggestion node comprises a description of fault symptom and corresponding solution, an image of the faulty component, a troubleshooting video or any combination thereof.

4. The method of claim 1, wherein the processing (v) comprises determining, from the one or more repair suggestion nodes, the repair suggestion node having the highest degree of vector-matching with the fault feature vector as the target repair suggestion node.

5. The method of claim 1, wherein the processing (v) comprises determining, from the one or more repair suggestion nodes, one or more repair suggestion nodes having a degree of vector-matching with the fault feature vector that exceeds a preset value as the target repair suggestion nodes.

6. A system for diagnosing vehicle faults using a knowledge graph, the system comprising:

a vehicle terminal; and a cloud server, wherein the system comprises one or more computer processors and a computer-readable memory, wherein the computer-readable memory comprises machine executable code that, upon execution by the one or more computer processors, causes:

the vehicle terminal to generate a fault snapshot image in the event of a vehicle fault; and the vehicle terminal to transmit the fault snapshot image to the cloud server, the cloud server to store a fault knowledge graph, wherein the fault knowledge graph comprises abnormal signal nodes, faulty component nodes and repair suggestion nodes, the abnormal signal nodes being each associated with one or more faulty component nodes that are related to a generation of the vehicle fault, the faulty component nodes being each associated with one or more repair suggestion nodes that provide repair suggestions for the faulty component node, and a plurality of the abnormal signal nodes having a mutual influence or co-occurrence relationship on a generation of the vehicle fault being associated with each other, wherein the machine executable code further causes the cloud server to receive the fault snapshot image from the vehicle terminal, and wherein the machine executable code further causes the cloud server to parse a vehicle information from the fault snapshot image, perform a progressive fault diagnosis in the fault knowledge graph based on the vehicle information to determine a target repair suggestion node, and transmit an information of the target repair suggestion node as a diagnostic information to the vehicle terminal, wherein the progressive fault diagnosis comprises:

(i) identifying an abnormal signal from the vehicle information;

(ii) locating in the knowledge graph the abnormal signal node corresponding to the abnormal signal;

(iii) determining one or more faulty component nodes associated with the abnormal signal node as candidate faulty component node(s);

(iv) determining one or more repair suggestion nodes associated with the candidate faulty component node (s);

(v) vector-matching one or more feature vectors of the one or more repair suggestion nodes with a fault feature vector extracted from the fault snapshot to determine the target repair suggestion node; and (vi) transmitting the target repair suggestion node as the diagnostic information to the vehicle terminal, wherein the processing (iii) comprises:

determining one or more other abnormal signal nodes that are associated with the abnormal signal node corresponding to the abnormal signal;

determining whether the one or more vehicle signals corresponding to the one or more other abnormal signal nodes are abnormal; and when the one or more vehicle signals corresponding to the one or more other abnormal signal nodes are abnormal, determining one or more faulty component nodes associated with the one or more other abnormal signal nodes as the candidate faulty component node(s), wherein the processing (v) comprises:

extracting the one or more feature vectors from the one or more repair suggestion nodes using a convolutional neural network model; and extracting the fault feature vector from the fault snapshot using the convolutional neural network model.

7. The system of claim 6, wherein the machine executable code further causes the cloud server to extract from the fault snapshot image the vehicle information that is associated with the vehicle fault, and wherein the vehicle information comprises a time of fault, a vehicle driving mode, a vehicle status, a vehicle sensor data, a vehicle driving data or any combination thereof.

8. The system of claim 6, wherein the repair suggestion node comprises a description of fault symptom and corresponding solution, an image of the faulty component, a troubleshooting video or any combination thereof.

9. The system of claim 6, wherein the processing (v) comprises determining, from the one or more repair suggestion nodes, the repair suggestion node having the highest degree of vector matching with the fault feature vector as the target repair suggestion node.

10. The system of claim 6, wherein the processing (v) comprises determining, from the one or more repair suggestion nodes, one or more repair suggestion nodes having a degree of vector matching with the fault feature vector that exceeds a preset value as the target repair suggestion nodes.

* * * * *